US010187321B2

(12) United States Patent
Maino et al.

(10) Patent No.: US 10,187,321 B2
(45) Date of Patent: Jan. 22, 2019

(54) DYNAMIC VPN POLICY MODEL WITH ENCRYPTION AND TRAFFIC ENGINEERING RESOLUTION

(71) Applicant: Cisco Technology, Inc., San Jose, CA (US)

(72) Inventors: Fabio R. Maino, Palo Alto, CA (US); Horia Miclea, Epalinges (CH); John Evans, Somerset (GB); Brian Eliot Weis, San Jose, CA (US); Vina Ermagan, Marina Del Rey, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/058,447

(22) Filed: Mar. 2, 2016

(65) Prior Publication Data
US 2017/0054758 A1 Feb. 23, 2017

Related U.S. Application Data

(60) Provisional application No. 62/207,137, filed on Aug. 19, 2015.

(51) Int. Cl.
*H04L 29/06* (2006.01)
*H04L 12/911* (2013.01)
(Continued)

(52) U.S. Cl.
CPC ........ *H04L 47/781* (2013.01); *H04L 41/5025* (2013.01); *H04L 43/0882* (2013.01); *H04L 45/64* (2013.01); *H04L 41/0823* (2013.01)

(58) Field of Classification Search
CPC ... H04L 63/20; H04L 63/0272; H04L 63/029; H04L 63/0428; H04L 43/0882; H04L 41/5025; H04L 41/0823
See application file for complete search history.

(56) References Cited

U.S. PATENT DOCUMENTS 6,539,427 B1   3/2003  Natarajan et al.
7,760,738 B1 *  7/2010  Chamas .............. H04L 12/4675
                                            370/238
(Continued)

OTHER PUBLICATIONS

International Search Report and Written Opinion in counterpart International Application No. PCT/US2016/047534, dated Nov. 2, 2016, 12 pages.

*Primary Examiner* — Saleh Najjar
*Assistant Examiner* — Devin E Almeida
(74) *Attorney, Agent, or Firm* — Edell, Shapiro & Finnan, LLC

(57) ABSTRACT

High-level network policies that represent a virtual private network (VPN) as a high-level policy model are received. The VPN is to provide secure connectivity between connection sites of the VPN based on the high-level network policies. The high-level network policies are translated into low-level device configuration information represented in a network overlay and used for configuring a network underlay that provides the connections sites to the VPN. The network underlay is configured with the device configuration information so that the network underlay implements the VPN in accordance with the high-level policies. It is determined whether the network underlay is operating to direct traffic flows between the connection sites in compliance with the high-level network policies. If it is determined that the network underlay is not operating in compliance, the network underlay is reconfigured with new low-level device configuration information so that the network underlay operates in compliance.

21 Claims, 12 Drawing Sheets

(51) Int. Cl.
*H04L 12/24* (2006.01)
*H04L 12/715* (2013.01)
*H04L 12/26* (2006.01)

(56) References Cited

U.S. PATENT DOCUMENTS

| | | | |
|---|---|---|---|
| 8,112,377 B2 | 2/2012 | Schmidt | |
| 8,260,922 B1* | 9/2012 | Aggarwal | H04L 45/24 |
| | | | 709/226 |
| 2002/0194584 A1 | 12/2002 | Suorsa et al. | |
| 2004/0230681 A1 | 11/2004 | Strassner et al. | |
| 2006/0259970 A1* | 11/2006 | Sheymov | G06F 21/55 |
| | | | 726/23 |
| 2008/0307519 A1* | 12/2008 | Curcio | H04L 63/0227 |
| | | | 726/15 |
| 2014/0355441 A1* | 12/2014 | Jain | H04L 45/64 |
| | | | 370/235 |
| 2015/0201417 A1* | 7/2015 | Raleigh | H04W 76/12 |
| | | | 370/329 |

* cited by examiner

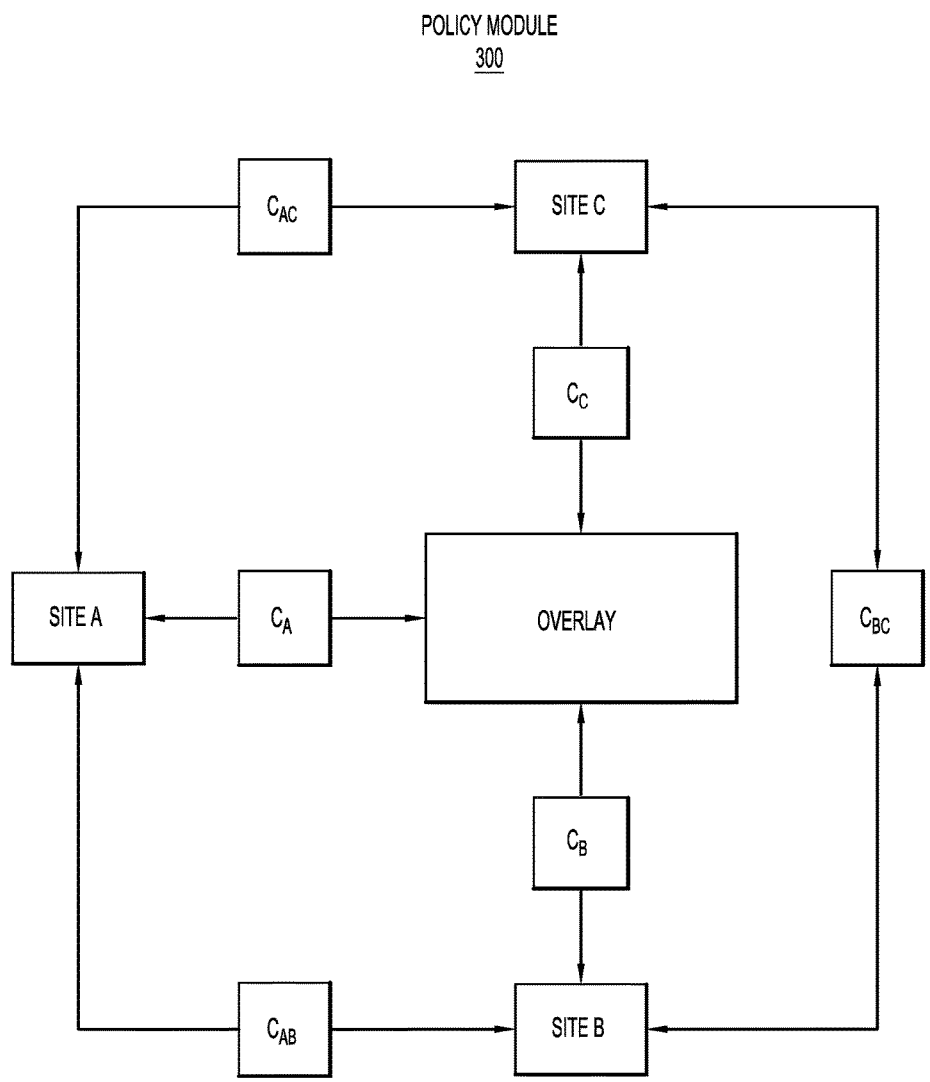
FIG.3
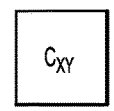 CONTRACT BETWEEN SITES X, Y

DYNAMIC VPN POLICY MODEL WITH ENCRYPTION AND TRAFFIC ENGINEERING RESOLUTION

PRIORITY CLAIM

This application claims priority to U.S. Provisional Application No. 62/207,137, filed Aug. 19, 2015, the entirety of which is incorporated herein by reference.

TECHNICAL FIELD

The present disclosure relates to virtual private networks.

BACKGROUND

Networks used in computing environments can be configured in many different manners. For example, a Local Area Network (LAN) is a group of computing devices that share a common communications line. Computing and storage resources can be shared within a LAN. Moreover, a LAN can be as small as a few computing devices or as large as an entire enterprise (e.g., office building, office complex, and the like). Another network configuration is a Wide Area Network (WAN). A WAN is a geographically dispersed telecommunications network. A classic example of a well known WAN is the Internet. A third network configuration is a Metropolitan Area Network (MAN), where computing devices are connected in a geographic region or specific area that is larger than a LAN and smaller than the typical WAN. Also, in recent years a new type of network, referred to as a Virtual Private Network (VPN), has emerged in industry. A VPN is a private network that takes advantage of public telecommunications and maintains privacy through use of tunneling protocols and security procedures.

For example, a company or business may enable a VPN within its network, and a public network (e.g., the Internet) may be used to route communications between a remote device and devices within the VPN of the company. Thus, remote devices can use "virtual" connections via a public network to connect to, and exchange secure communications with, devices within a VPN. These communications can also be encrypted so that devices that are not authenticated or otherwise allowed to access the VPN are unable to decrypt and access the communications.

BRIEF DESCRIPTION OF THE DRAWINGS

FIG. 3 is an illustration of a VPN policy model used in the iVPN architecture, according to an embodiment.

DESCRIPTION OF EXAMPLE EMBODIMENTS

Overview

Figure 1:
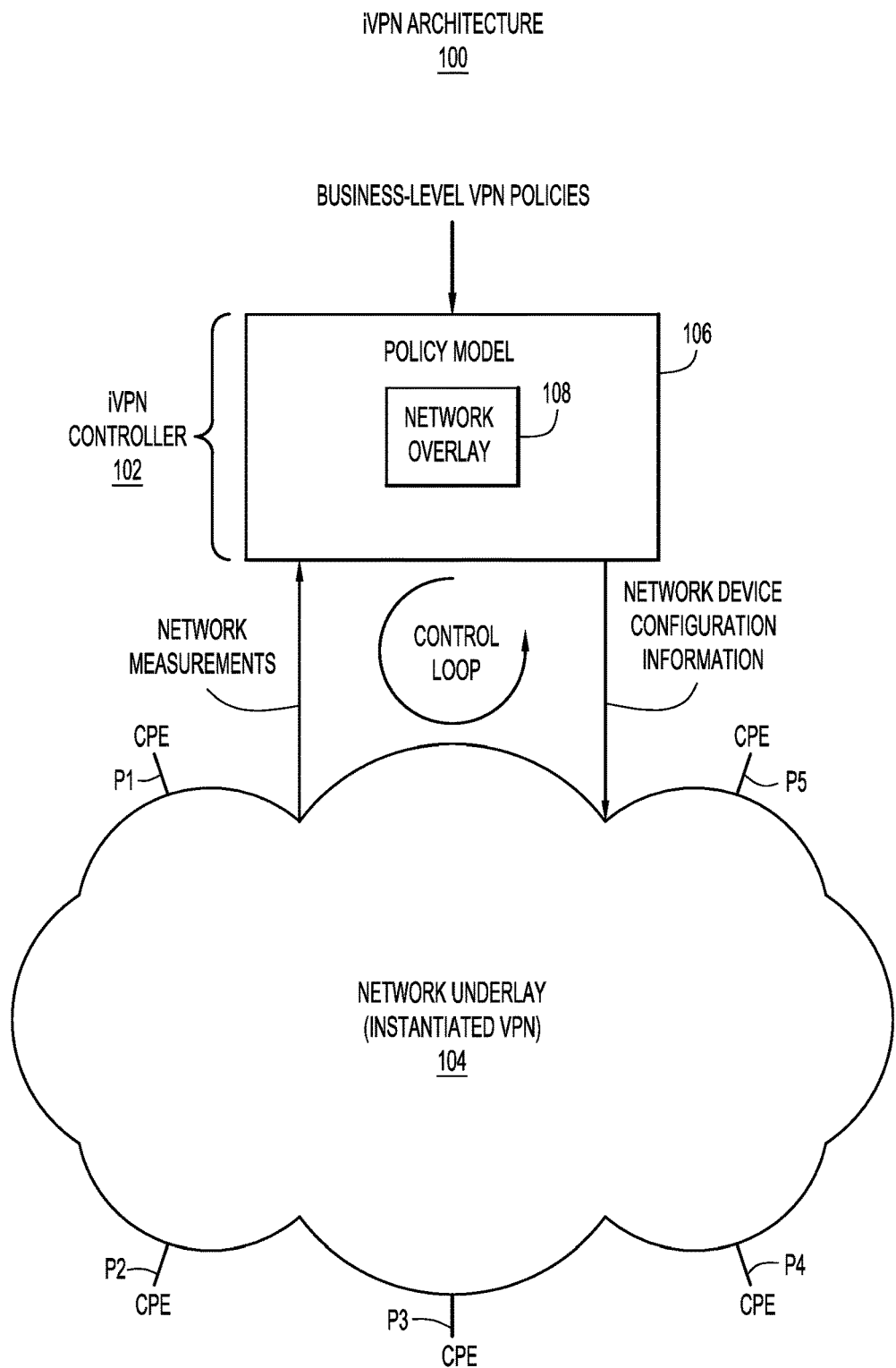
FIG. 1 is a high-level block diagram of an iVPN architecture, according to an embodiment.

High-level network policies that represent a virtual private network (VPN) as a high-level policy model are received. The VPN is to provide secure connectivity between connection sites of the VPN based on the high-level network policies. The high-level network policies are translated into low-level device configuration information represented in a network overlay and are used for configuring a network underlay that provides the connections sites to the VPN. The network underlay is configured with the device configuration information so that the network underlay implements the VPN in accordance with the high-level policies. It is determined whether the network underlay is operating to direct traffic flows between the connection sites in compliance with the high-level network policies. If it is determined that the network underlay is not operating in compliance, the network underlay is reconfigured with new low-level device configuration information so that the network underlay operates in compliance.

DETAILED DESCRIPTION

Current Virtual Private Network (VPN) technologies use distributed network protocols to create VPNs for customers on top of a shared network infrastructure (e.g., either Multiprotocol Label Switching (MPLS) or Internet Protocol (IP) based) that interconnects (i.e., connects) Customer Premises Equipment (CPE). Conventional VPNs are abstracted mostly in terms of the connectivity to which they provide, with a focus on the forwarding policy. Such abstraction is typically limited to multiple (segmented) virtual networks that implement a logical topology on top of a physical network infrastructure. In practice, VPNs are secured overlays that are deployed not only to provide connectivity, but also to implement a number of policies on top of the virtual topology. These policies may include, for example: (1) security policies, such as those that require data confidentiality, data integrity, data origin authentication, or those that express micro-segmentation policies, such as Group Based Policies (GBP); (2) attachment and transport policies such as multi-homing and address family requirements; and (3) traffic engineering (TE) policies used to select specific paths in the network, as well as service chaining policies. Many of these policies may be changed dynamically, for example, to reflect changes in the higher business-level policy requirements, to reflect changes in the underlying physical network infrastructure, or because the polices are only specified for a given class of traffic (e.g., a specific flow).

To address these issues, presented herein is an adaptable and dynamic security overlay model, defined in one set of policies, that can be used to translate a high-level or business-level policy that is associated with a VPN into a low-level or network-level policy. The overlay model in accordance with the techniques presented herein provides a closed-control loop that measures the discrepancy between an implemented network-level policy and a specified business-level policy. Upon detection of a discrepancy, the control loop can automatically and dynamically adapt the network-level policies to enforce a service-level agreement (SLA) and report the measured discrepancy to the interested parties. As such, a change to the policy can be reacted to holistically and implemented in a unified fashion.

The techniques presented herein include three primary components, namely: (1) a policy model that can be used to describe the business-level policies; (2) a VPN policy resolver that translates business-level policies into network-level policies; and (3) a closed-loop system that measures, in real time, the discrepancy between the implemented network-level policy and the intended business-level policy and that brings those measures back to the VPN policy resolver. As such, the VPN policy resolver can then react to minimize the discrepancy. In certain examples, these components are implemented as part of a so-called "iVPN" system architecture. An iVPN system architecture is an edge-to-edge IP Overlay Layer 2 (L2)/Layer 3 (L3) VPN system architecture (also referred to as either an "iVPN architecture" or an "iVPN system") that utilizes a centralized control infrastructure as the single policy control point for all network services so as to integrate VPN policy, Traffic Engineering (Segment Routing) policy, and service insertion (NSH) policy.

The iVPN architecture provides a user with a higher level abstraction of the VPN, thereby exposing a Dynamic Policy Model that represents the VPN and its attributes (connectivity policy, security policy, Traffic Engineering and service chaining policy). Some of the attributes may change over time and may, accordingly, drive a change of the applied policy. For example, the Traffic Engineering policy may impose multiple connectivity paths that may change over time due to, for example, congestion, availability, and the like, and the encryption policy may accordingly need to adapt to those changes (e.g., by adding encryption when a connection that was going over a private transport switches to a public transport).

FIG. 1 is a high-level block diagram of an example iVPN architecture 100 that implements the features described above, according to an embodiment. The iVPN architecture 100 includes a centralized iVPN controller 102 (also referred to as a "network controller" 102) and a network underlay 104. The iVPN controller 102 implements a VPN policy model 106 and a network overlay 108 associated with the policy model to define, configure, and control a VPN instantiated (i.e., implemented) in network underlay 104. Network underlay 104 represents a configurable physical network infrastructure, including interconnected network devices, such as network routers, switches, and the like, to implement the VPN and provide attachment/connection points or sites to the VPN (e.g., attachment/connection points P1-P5) by which CPE may connect with the VPN. Network underlay 104 may form part of, or include, one or more local area networks (LANs) and one or more wide area networks (WANs), such as the Internet.

Figure 2:
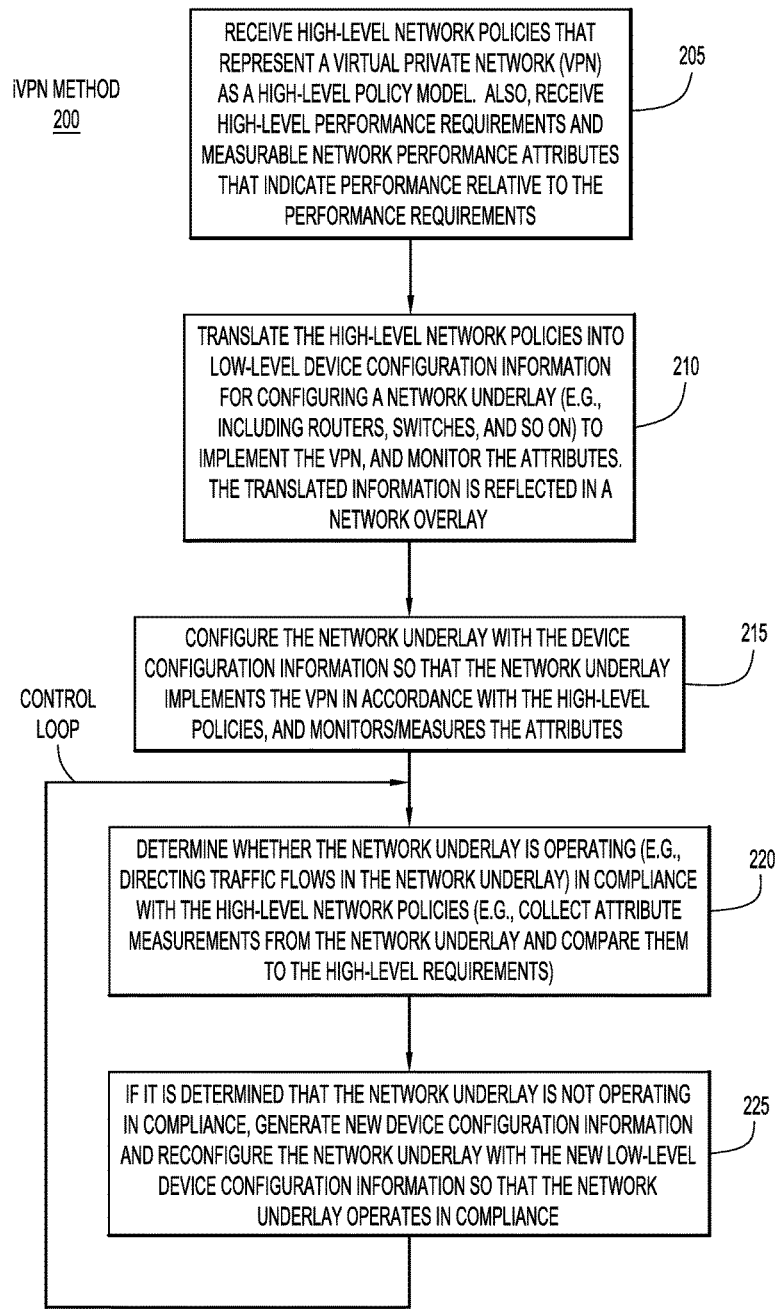
FIG. 2 is a flowchart of high-level operations performed in the iVPN architecture to implement and then monitor operation of a VPN in a network underlay of the iVPN architecture, according to an embodiment.

With reference to FIG. 2, there is a flowchart of high-level operations 200 (comprising operations 205-225) performed in iVPN architecture 100 to implement and then monitor operation of a VPN in network underlay 104. Operations 210-225 are considered automated operations because they are performed by computers and/or network devices automatically, i.e., without manual intervention.

At 205, controller 102 receives high-level, intent-based VPN policies (also referred to as "high-level policies") formatted in accordance with a predefined syntax and that collectively represent policy model 106 that defines the VPN at a high-level. The high-level policies may be input by a network administrator, for example. The high-level policies may represent business-level VPN policies (also referred to as "business-level policies") that include one or more of a connectivity policy, a topology policy, an encryption policy, a traffic engineering policy, and a traffic insertion policy, for example. The high-level policies may each include a network policy requirement (e.g., a performance requirement) for the given high-level policy, and a measurable (operational) network performance attribute that indicates whether network underlay 104 in which the VPN is implemented is operating in compliance with the given network policy requirement.

At 210, controller 102 translates the high-level policies into low-level policies (i.e., network-level policies) represented by and stored in network overlay 108 in "object" form, including configuration scripts and the like, for example. The network level policies include network device configuration information for configuring the network devices of network underlay 104. In an example, the network device configuration information may include forwarding states and other configuration information used to forward network traffic between attachment sites of network underlay 104, and encryption algorithms and other configuration information (e.g., keying material generated in accordance with the encryption algorithms) used to encrypt the network traffic in the network underlay. Thus, network overlay 108 represents an abstraction of a configuration of network underlay 104 and that is to be implemented in the network underlay to instantiate the VPN. Because network overlay 108 may include encryption information for the VPN, the network overlay may also be referred to as a "secure overlay."

At 215, controller 102 configures the physical networking infrastructure, such as network routers, in network underlay 104 with the network device configuration information from 210 (reflected in network overlay 108) so that the network underlay implements the VPN according to the high-level policies.

In next operations 220 and 225, controller 102 and network underlay 104 cooperate to implement a control loop that ensures the network underlay operates (e.g., directs and encrypts traffic flows between attachment sites P1-P5 of the VPN) in compliance with the high-level policies over time.

For example, at 220, network underlay 104 measures the network performance attributes indicated in the low-level policies and reports the measurements to controller 102. Controller 102 receives/collects the measurements from network underlay 104, and determines whether the network underlay is operating in accordance with the high-level policies based on the measurements. For example, controller 102 compares the collected measurements to the corresponding high-level policy performance requirements accompanying the high-level policies.

At 225, if controller 102 determines that network underlay 104 is not operating in compliance with one or more of the high-level policies based on the compare at 220, controller 102 generates new network device configuration information for network underlay 104 and reconfigures the network underlay with the new network device configuration information so that the network underlay operates in compliance with the high-level policies.

As described above, controller 102 receives high-level (e.g., business-level) policies that define the VPN in accordance with policy model 106. It is to be appreciated that there are various ways to model an iVPN using a policy model and techniques presented herein may be used with different models. For example, in accordance with one example, a VPN is defined in accordance with a policy model by introducing the concept of a "TENANT," which represents the customer that "owns" the VPN. The concepts of an "INSTANCE" (or "CONTEXT") is also introduced as a further partition that identifies separate Virtual Routing and Forwarding (VRF) to represent macro-segmentation into separate Internet Protocol (IP) address spaces that belong to the same TENANT. Within each INSTANCE, the concept of "SITES" is introduced. SITES are a collection of "ENDPOINTS" that belong to the same INSTANCE of the virtual network. An "OVERLAY" represents, in an abstract sense, the set of network resources (e.g., switches, router, services, paths, encapsulations, address families, and the like) available to implement the VPN for a given TENANT. In the example of FIG. 1, network overlay 108 includes an abstract representation of the set of network resources available in network underlay 104

The business-level policies that are selected for implementation by a TENANT with the VPN are relationships between SITES, or between a SITE and the OVERLAY. Those relationships (in this particular model of iVPN) are represented by "CONTRACTs." A CONTRACT defines inbound and outbound rules applied to traffic exchanged between those two entities. Thus, in accordance with examples presented herein, iVPN business policies may compose a set of CONTRACTS that exists between endpoint groups (EPGs), SITES, and the OVERLAY, where an EPG may represent a logical representation of set of ENDPOINTS, and a SITE may be a logical representation of a set of Customer Premises Equipment (CPE) routers that constitutes the attachment points to the VPN.

With reference to FIG. 3, there is an illustration of an example policy model 300 including the above-mentioned constructs. For example, as shown in FIG. 3, the multi-homing of a SITE A with an OVERLAY is expressed by a "CLAUSE" in the CONTRACT $C_A$ between SITE A and the OVERLAY. The number of attachment points, or load balancing for incoming and outgoing traffic, can be a measurable network performance "ATTRIBUTE" of that CLAUSE that may be monitored. Each ATTRIBUTE may be associated with a measurement thereof referred to as "COUNTERS" that reflect a real time state of the ATTRIBUTE (e.g., attachment point up/down, number of packets sent over that link, usage bandwidth, and the like).

Relationships between SITES are also represented by CONTRACTS between those two SITES. In the example of FIG. 3, policy model 300 includes contracts $C_{AC}$, $C_{BC}$, $C_{AB}$, $C_A$, $C_B$, and $C_C$ between SITES A and C, SITES B and C, SITES A and B, the OVERLAY and SITE A, the OVERLAY and SITE B, and the OVERLAY and SITE C, respectively. For example, if encryption is required for network traffic exchanged between SITES A and B, a CLAUSE of associated CONTRACT $C_{AB}$ will specify the required encryption (including the subset of traffic subject to that CLAUSE). As another example, if a certain topology, such as a Hub-and-Spoke arrangement, needs to be enforced in a VPN, a CLAUSE of the CONTRACT between the Hub and a Spoke will allow communication, but a CLAUSE of the CONTRACT between two Spokes will be allowed or disallowed depending on business requirements associated with those Spokes.

The dynamic nature of the network can be reflected in the CONTRACTS in a way such that if a monitored ATTRIBUTE specified in the contract hits a certain required value, then remedies can be automatically initiated. For example, the CONTRACT between a SITE and the OVERLAY may specify that if the COUNTER reflects the volume of traffic or usage bandwidth associated with an attached point goes above a certain threshold, THEN a new attachment point shall be instantiated. As such, the techniques presented herein enable the implementation of reactive features in iVPN to automatically handle real time events.

In an example, a CONTRACT may specify a network performance requirement that link bandwidth usage at a given SITE (e.g., edge router) not exceed a predetermined fraction of a maximum link capacity (i.e., maximum communication bandwidth) of the SITE, e.g., 70 percent. The measurable ATTRIBUTE at the SITE is link bandwidth usage. During operation of an implemented VPN, controller 102 collects link bandwidth usage measurements from the SITE and compares them to the network performance requirement. If the comparison indicates that the link bandwidth usage exceeds the predetermined fraction of 70%, controller 102 generates new configuration information for the SITE and reconfigures the SITE so that the SITE has a higher maximum link capacity to bring down the fraction of maximum link capacity being used to below 70%. The SITE may be reconfigured to add an additional link to an existing link in order to increase the maximum link capacity, or the maximum capacity of the existing link may be increased.

In another example, a CONTRACT may specify that a SITE is to communicate securely over both a secure physical link without encryption and over an unsecure physical link with encryption. Assume that the SITE is configured to operate two such links in accordance with the CONTRACT and sends to controller 102 link status for each link (i.e., the measurable ATTRIBUTE is link status). Assume that the link status indicates the unsecure physical link has failed. Controller 102 consults the CONTRACT, recognizes that an unsecure physical link is now missing and needed according to the CONTRACT, and thus reconfigures the SITE to send all communications over the secure physical link until such time that a new unsecure physical link is configured over which encrypted information is to be sent.

In certain examples, the VPN model makes use of some of the high-level objects used in an Application Centric Infrastructure (ACI) architecture. This makes the policy model described herein orthogonal and complementary to the Endpoint Groups (EPG) model, as EPG can be used as part of the iVPN solution to express micro segmentation policies that are applied to a group of equivalent endpoints. However, the VPN model itself is additive to the ACI architecture.

As noted, the above example implementation leverages semantic of constructs that are similar to the ACI architecture. However, it is to be appreciated that examples presented herein may utilize different instances of iVPN policy models having different constructs.

Figure 4:
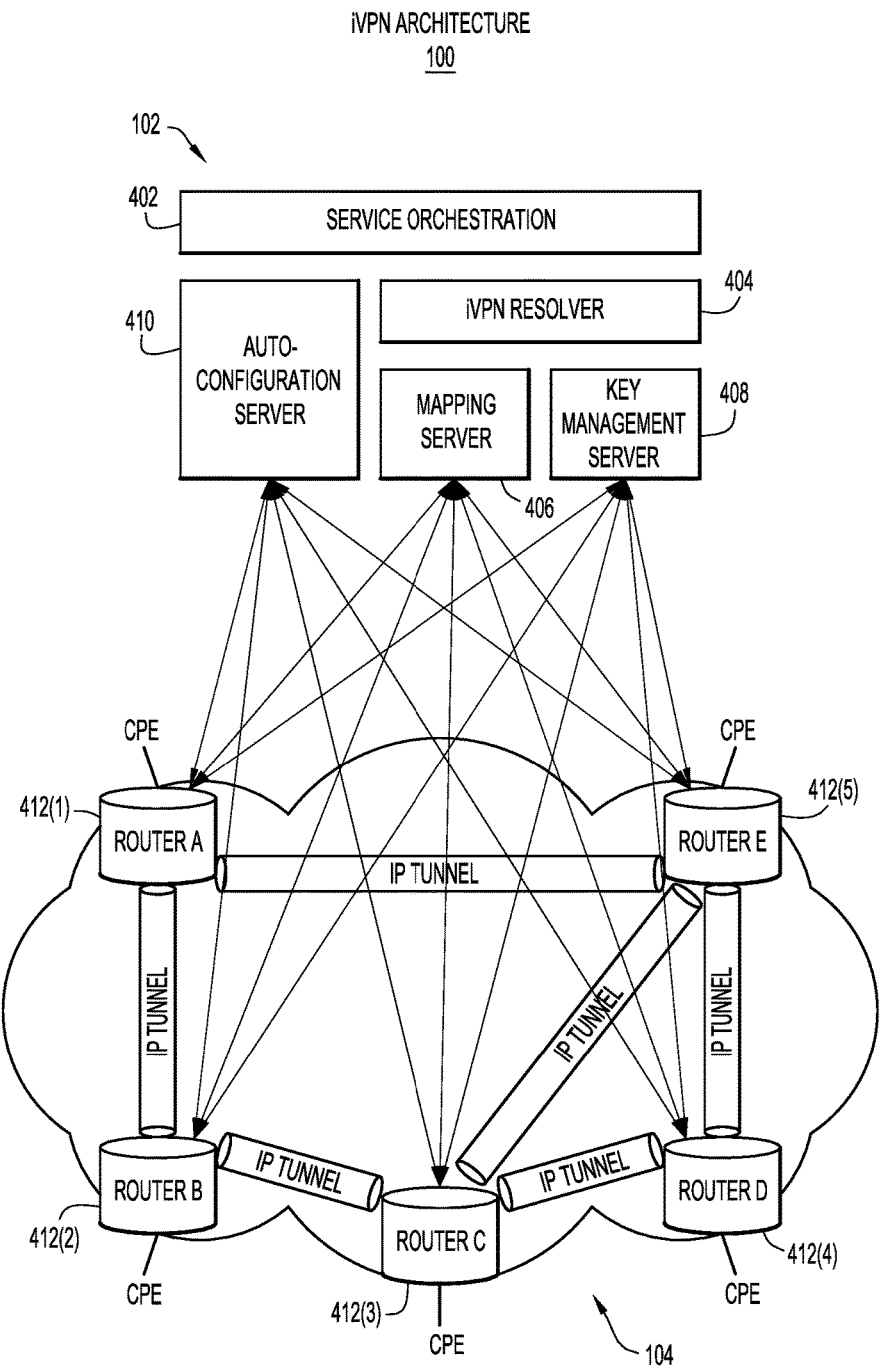
FIG. 4 is an illustration of a detailed block diagram of the iVPN architecture of FIG. 1, according to an embodiment.

With reference to FIG. 4, there is an illustration of a detailed block diagram of iVPN architecture 100, according to an embodiment. Controller 102 is configured with a set of controller components including a service orchestration module 402, an iVPN policy resolver 404, a mapping server 406, a key management server 408, and an autoconfiguration server 410. These controller components establish policy model 106 and network overlay 108 (not shown in FIG. 4.) based on the received high-level policies and configure network underlay 104 so as to represent/instantiate the network overlay. Network underlay 104 includes network gateway devices, such as VPN edge routers 412(1)-412(5) (also labeled Router A—Router E, respectively), interconnected (i.e., connected to each other) by IP tunnels established over an underlying IP (e.g., IPv4 and/or IPv6) or Multiprotocol Label Switching (MPLS) transport network, with optional encryption. Edge routers 412 represent attachment points/sites to the VPN for various CPE. The above-mentioned components of controller 102 may communicate with network underlay 104 and the CPE via one or more local area and/or wide area networks over one or more network connections/links between controller 102 and the network devices in the network underlay and the CPE.

Autoconfiguration server 410 authenticates and authorizes the CPE to be attached to the VPN and provides initial or "day-0" configuration information for the CPE and network devices in network underlay 104, such as address allocations for edge routers 412.

Service Orchestration module 402 operates as a "cross-domain" orchestrator that orchestrates policy within and between TENANTS and is responsible for overall control of instantiating the VPN. Service orchestration module 402 may present interactive user interfaces (UIs) to solicit and receive high-level policies from a user, and to provide received high-level policies to policy resolver 404.

Policy resolver 404 presents an abstracted northbound interface to receive the high-level policies from service orchestration module 402. Policy resolver 404 may represent a single point for applying policies in the system. Policy resolver 404 translates the high-level policies to the low-level or network-level policies/network device configuration information and provides such information to mapping server 406 and key management server 408. For example, policy resolver 404 resolves forwarding states for VPN connectivity, topology, encryption, traffic engineering (SR), and service insertion (NSH) high-level policies, and provides the forwarding states to mapping server 406. Similarly, policy resolver 404 provides translated encryption policy information, such as encryption algorithms, key lifetimes, and the like, to key management server 408.

Mapping Server 406 stores the forwarding states from policy resolver 404 and also provides (i.e., pushes) the forwarding states to the network devices of network underlay 104, including edge routers 412, e.g. using the Locator/ID Separation Protocol (LISP) with appropriate LISP Canonical Address Format (LCAF) extensions that represent an enhancement to LISP. Thus, in an embodiment, mapping server 406 implements a LISP overlay mapping system. Multiple mapping servers may be used for resiliency, scale and multitenancy, i.e. separate servers are used per tenant.

Key management server 408 stores the translated encryption policy information (e.g., encryption algorithms and key lifetimes) from policy resolver 404 and also serves or pushes that information to edge routers 412, e.g. using Internet Key Exchange Protocol Version 2 (IKEv2). Key management server 408 also creates cryptographic keying material dynamically in accordance with the encryption policy information and distributes the keying material to edge routers 412 (and to the CPE), which are configured to encrypt and decrypt data based on the translated encryption policy information and the keying material. In an embodiment, key management server 408 functions as a centralized key management (CKM)/extensible security for overlay networks (ESON)/Group Encrypted Transport VPN (GET-VPN), which implements a secure overlay; however, other secure overlay technologies could be used. Multiple key management servers are used for resiliency, scale and multitenancy, i.e. separate key management servers are used per tenant.

Once the VPN is implemented in network underlay 104, various network devices in the network underlay, such as edge routers 412, measure the network performance attributes associated with traffic flows in the VPN, and report the measurements to controller 102. The various components of controller 102 cooperate to ensure that the VPN maintains compliance with the high-level network policies based on the reported measurements. For example, if the measurements indicate that the VPN is not in compliance with the high-level policies, policy resolver 404, mapping server 406, and key server 408 collectively generate new network device configuration information, e.g., forwarding states and encryption policy and configuration information, and push the new network device configuration information to the network devices, e.g., edge routers 412, as necessary so that the VPN operates in compliance. In this way, the controlling infrastructure (e.g., of controller 102 and network underlay 104) implements a closed-loop system that monitors discrepancies (differences) between the intended policy (i.e., high-level policy) and the actual implemented policy, reacting accordingly to minimize such discrepancies.

Figure 5:
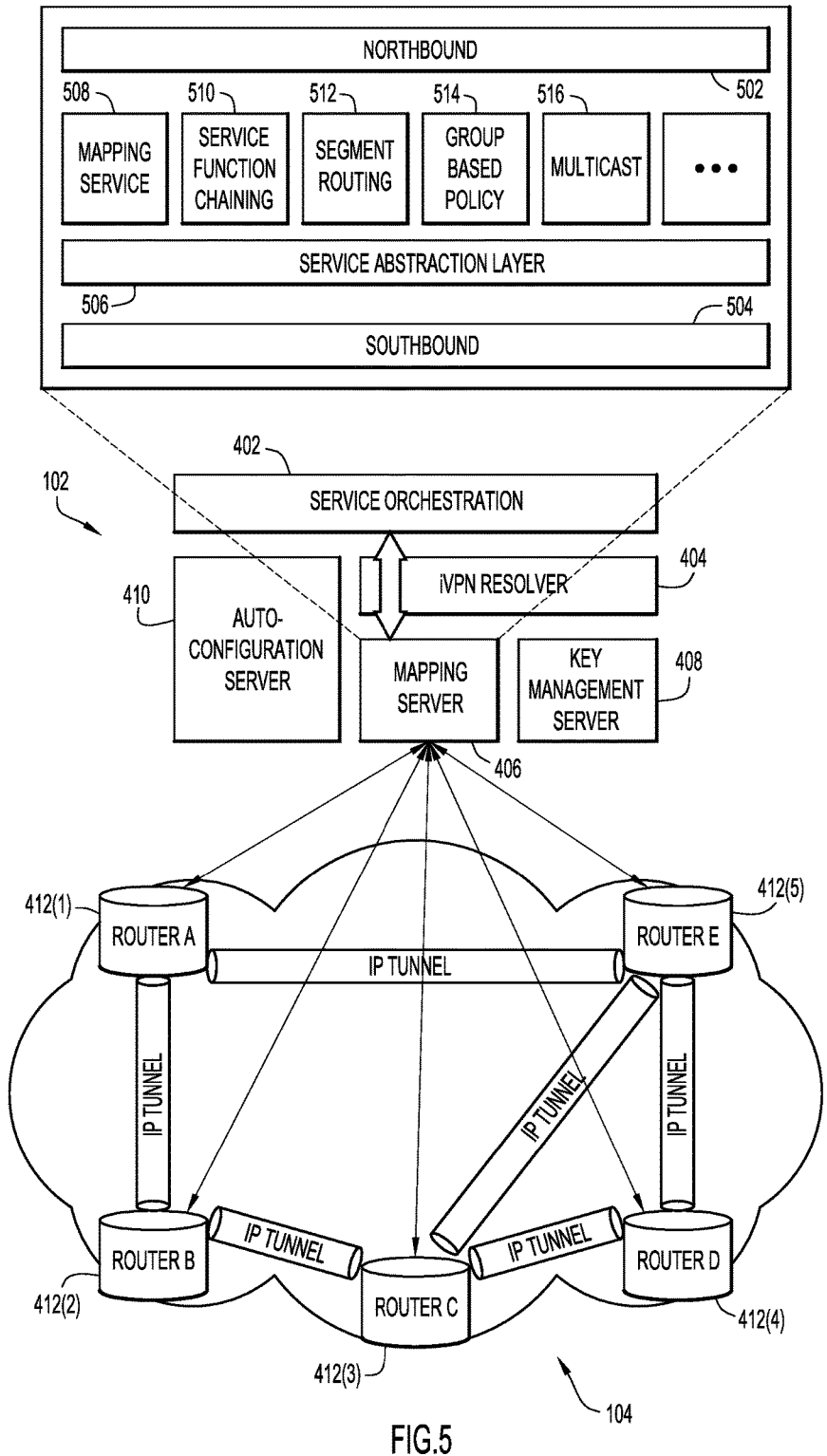
FIG. 5 is a detailed block diagram of a mapping server in the iVPN architecture of FIG. 4, according to an embodiment.

With reference to FIG. 5, there is a detailed block diagram of mapping server 406 from FIG. 4, according to an embodiment. In the example of FIG. 5, mapping server 406 includes a northbound interface 502 to receive resolved policy information (e.g., forwarding states) from policy resolver 404, and a southbound interface 504 through which the policy resolver pushes the resolved policy information to edge routers 412. Mapping server 406 also includes a network service abstraction layer 506 that hosts various high-level-to-low-level mapping services, including a mapping service 508, function chaining 510, segment routing 512, a group based policy 514, a multicast policy 516, and the like.

FIGS. 6-10 described below show a series of operations performed by mapping server 406 and key server 408 to instantiate a VPN in network underlay 104 based on example high-level policies.

Figure 6:
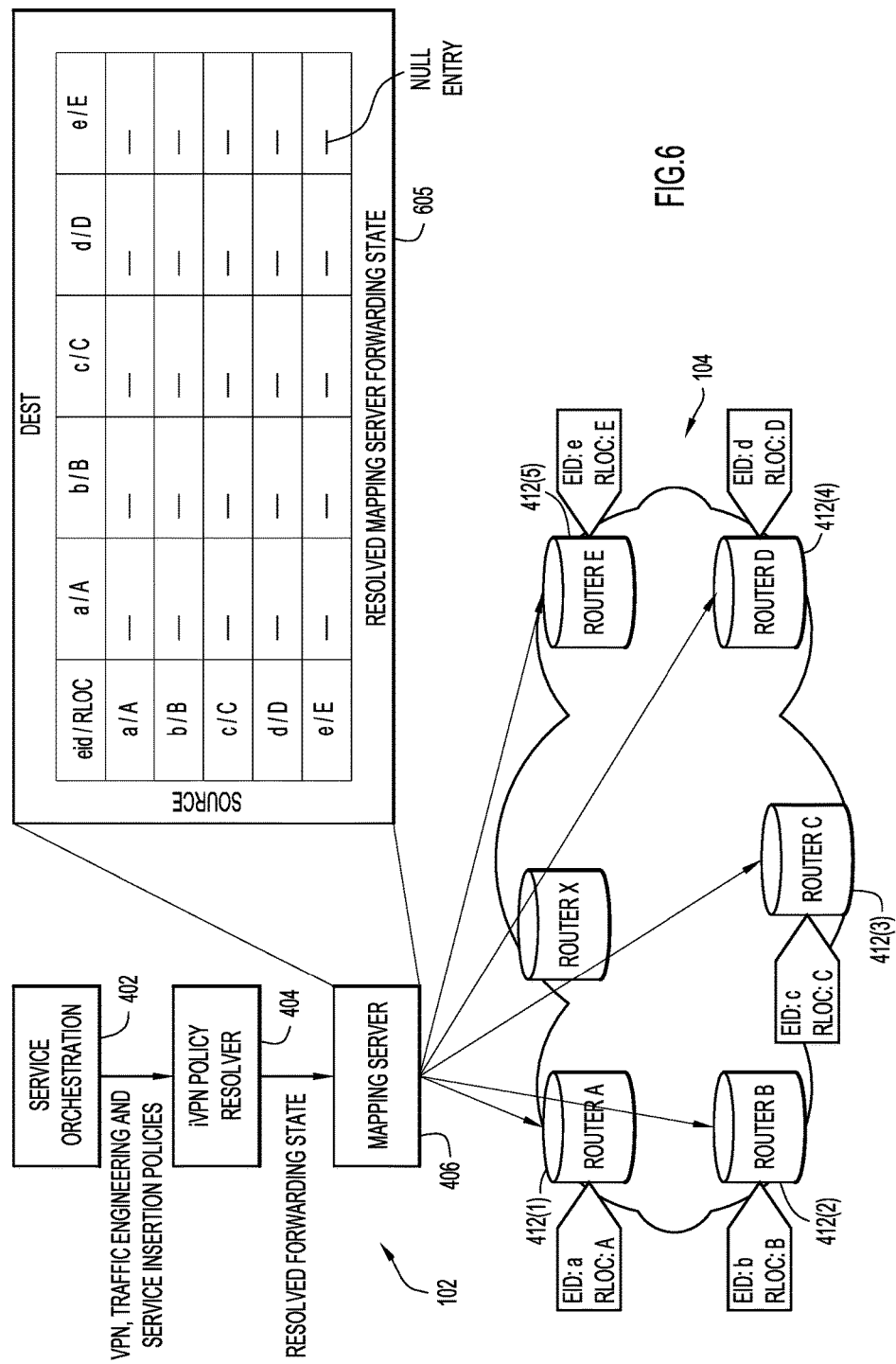
FIG. 6 is an illustration of the mapping server in an initial or default state before high-level policies have been applied in the iVPN architecture, according to an embodiment.

With reference to FIG. 6, there is an illustration of mapping server 406 in an initial or default state before high-level policies have been received, translated, and instantiated in network underlay 104. Mapping server 406 maintains a forwarding table 605 having entries to store resolved forwarding states that represent network connectivity or, alternatively, no connectivity between source network devices and destination network devices (e.g., between various ones of edge routers 412) in network underlay 104, as required by high-level polices. Table 605 includes row indices and column indices represented as addresses of the source network devices and addresses of the destination network devices, respectively. In accordance with LISP, the aforementioned address (e.g., IP address) of each given network device (e.g., edge router) may be associated with and represented by an endpoint identifier (EID) and a corresponding routing locator (RLOC).

In the example of FIG. 6, edge router 412(1) (router A) has EID a and RLOC A, edge router 412(2) (router B) has EID b and RLOC B, edge router 412(3) (router C) has EID c and RLOC C, edge router 412(4) (router D) has EID d and RLOC D, and edge router 412(5) (router E) has EID e and RLOC E. Either service orchestrator 402 or mapping server 406 may push the appropriate EID and RLOC to each of edge routers 412. An entry in table 605 indexed by a given pair of source (row) and destination (column) addresses (e.g., EID/ROLC) represents (i) a connection between the corresponding pair of source and destination network devices (having those address) if that entry stores the destination address (assigned RLOC), and (ii) no such connection if that entry stores a null value "–." In the initial or default state, all of the entries of table 605 store null values indicating no connectivity between edge routers 412. In the example of FIG. 6, another router "router X" is shown in network underlay 104.

Figure 7:
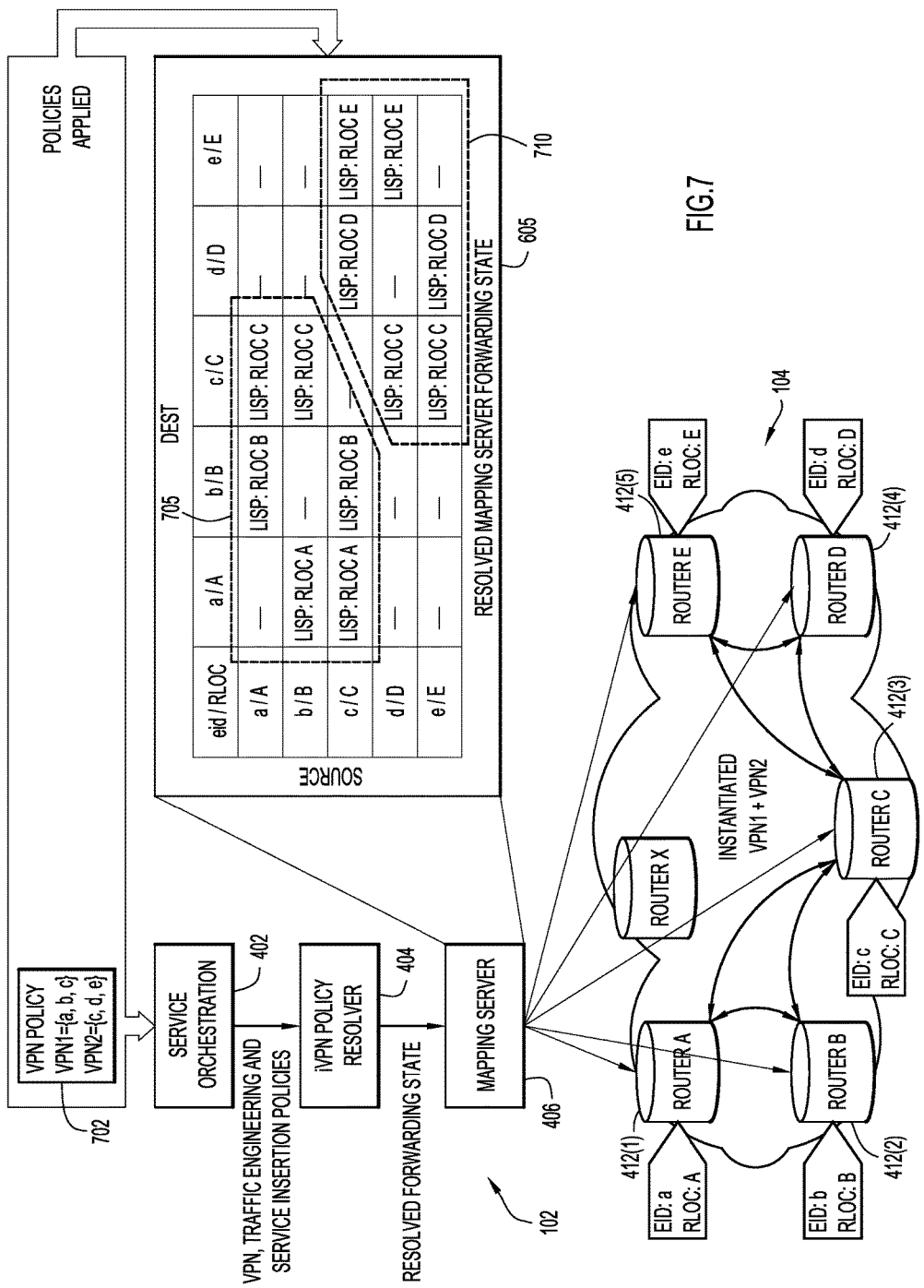
FIG. 7 is an illustration of the mapping server after high-level connectivity policies have been applied in the iVPN architecture, according to an embodiment.

With reference to FIG. 7, there is an illustration of mapping server 406 after high-level connectivity policies 702 have been applied, i.e., received, translated into forwarding states for storage in a mapping table 605 of the mapping server, and pushed from the mapping server to appropriate ones of edge routers 412. High-level connectivity policies 702 define a first VPN VPN1 with connectivity between sites represented by edge routers A, B, and C, and a second VPN VPN2 with connectivity between sites represented by edge routers C, D, and E. The appropriate entries of table 605 store the resolved forwarding states for VPNs VPN1 and VPN2 as indicated generally at 705 and 710, respectively.

Figure 8:
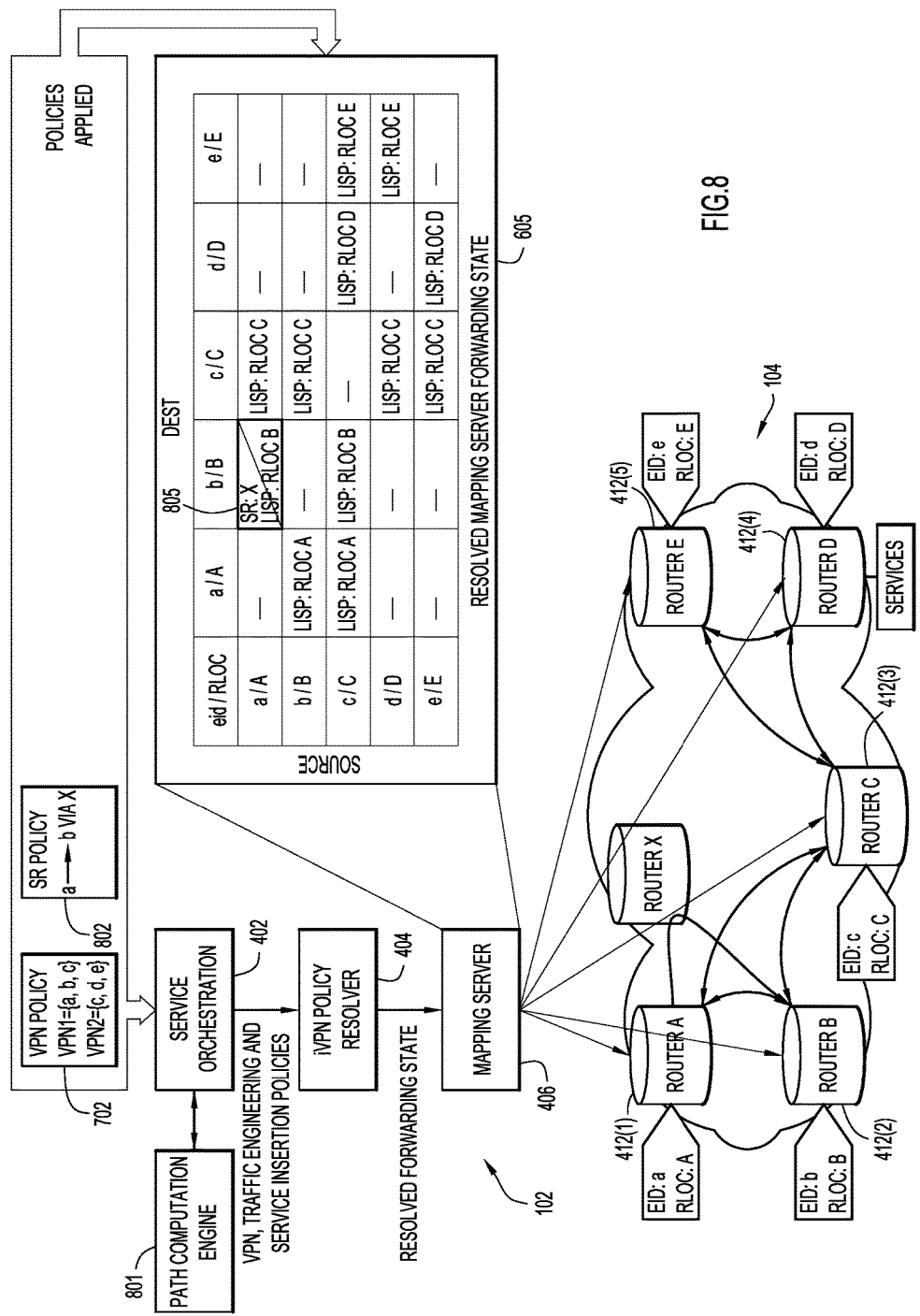
FIG. 8 is an illustration of the mapping server after a high-level segment routing policy has been applied in the iVPN architecture, according to an embodiment.

With reference to FIG. 8, there is an illustration of mapping server 406 after a high-level SR policy 802 has been applied. High-level SR policy 802 dictates network traffic flow from router (site) A to router (site) B via router X. An appropriate entry 805 of table 605 stores the resolved forwarding state for SR policy 802. Entry 805 indicates connectivity between routers A and B, but that traffic flow between those routers is to be routed through router X. In the example of FIG. 8, controller 102 includes a path computation engine 801 to compute shortest path (traffic) routes that comply with high-level SR policy 802.

Figure 9:
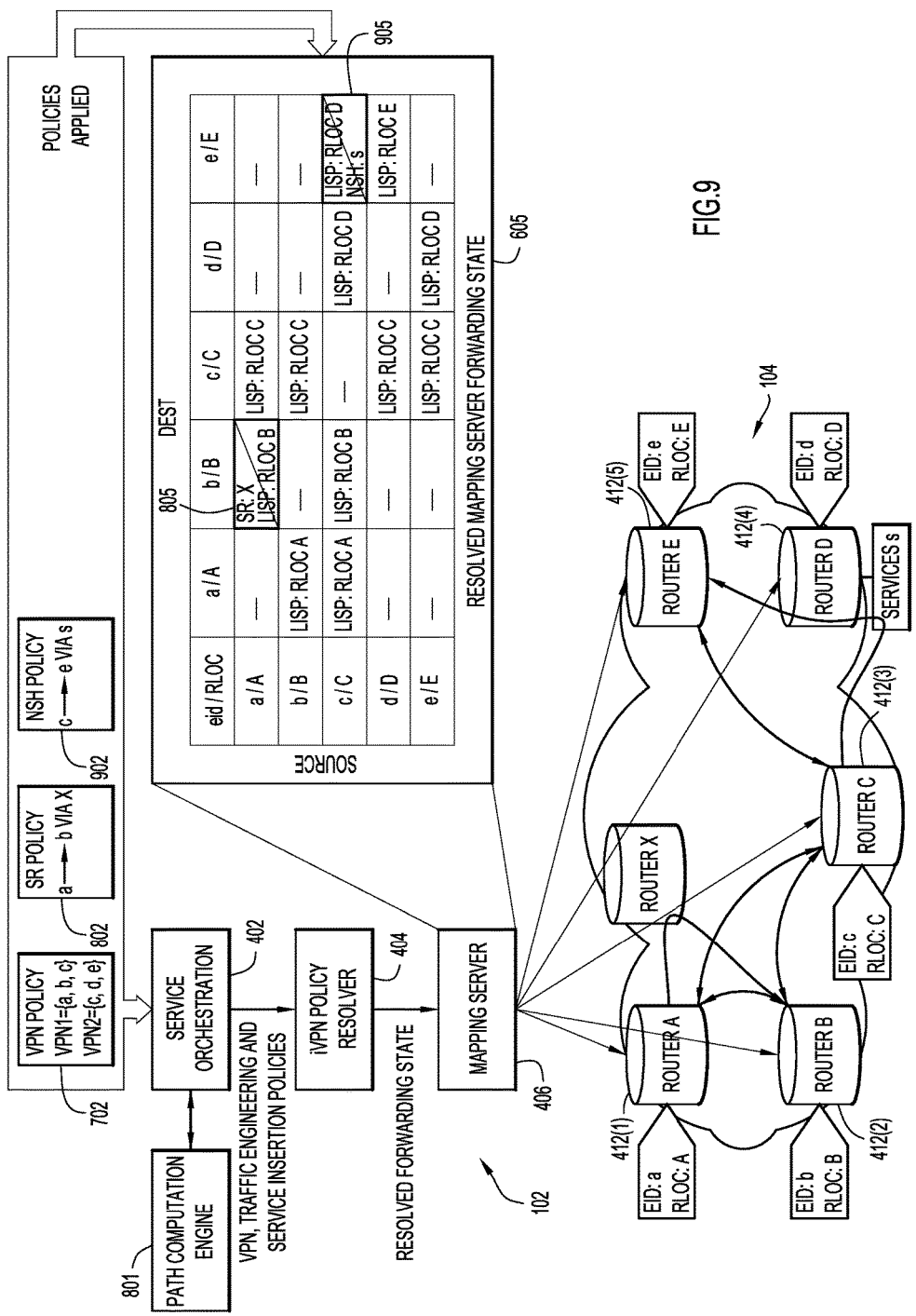
FIG. 9 is an illustration of the mapping server after a high-level service insertion policy has been applied in the iVPN architecture, according to an embodiment.

With reference to FIG. 9, there is an illustration of mapping server 406 after a high-level NSH policy 902 has been applied. High-level NSH policy 902 dictates network traffic flow from router C to router E via a service s accessible via router D. The appropriate entry of table 605 stores the resolved forwarding state for the NHS policy, as indicated at 905. The entry at 905 indicates connectivity between routers C and E, but that traffic flows from router C to router E through service s.

Figure 10:
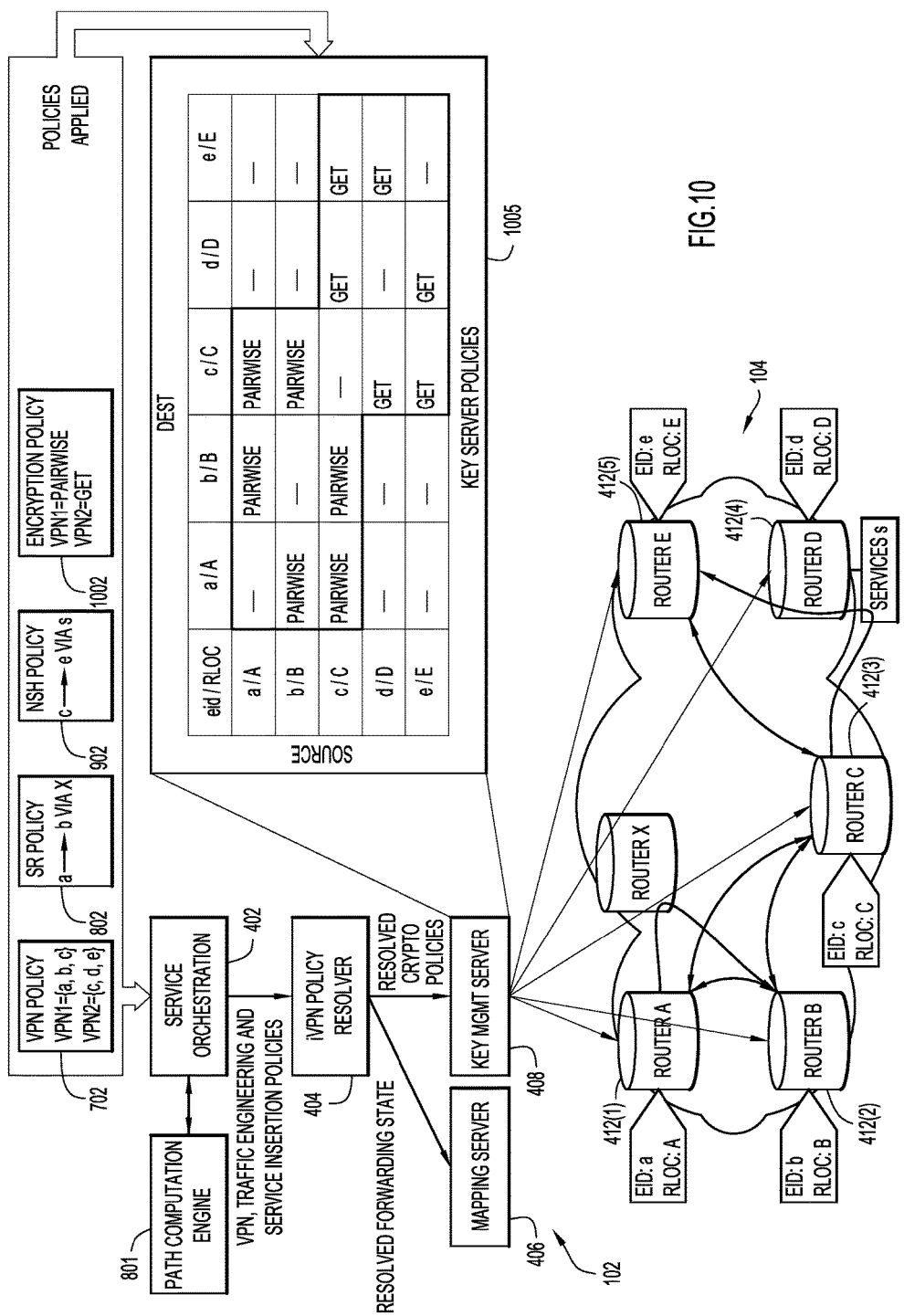
FIG. 10 is an illustration of a key management server of the iVPN architecture of FIG. 4 after a high-level encryption policy has been applied in the iVPN architecture, according to an embodiment.

With reference to FIG. 10, there is an illustration of key management server 408 after a high-level encryption policy 1002 has been applied, i.e., received, translated into encryption configuration information for storage in a key server table 1005 (also referred to as a "key server policies table 1005"), and pushed from the key server to appropriate ones of edge routers 412. Received high-level encryption policy 1002 defines pairwise encryption and "GET" for VPNs VPN 1 and VPN2, respectively. In another example, the high-level encryption policy may set an encryption field-width, e.g., 128-bit or 256-bit encryption. The appropriate entries of table 1005 store the encryption information as dictated by encryption policy 1002, as depicted in FIG. 10.

Figure 11:
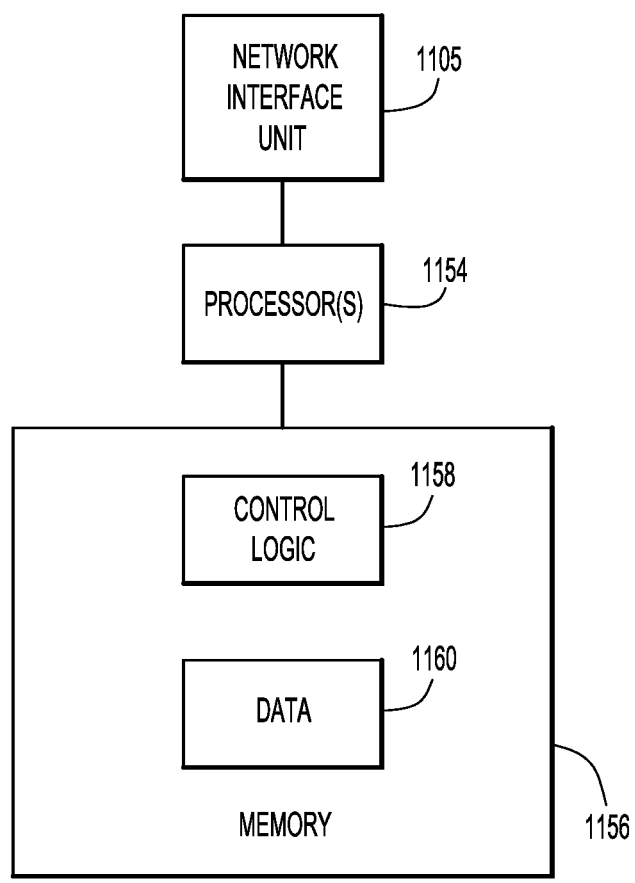
FIG. 11 is a block diagram of a computer device for implementing an iVPN controller of FIGS. 1 and 4, according to an embodiment.

With reference to FIG. 11, there is a block diagram of an example computer device 1100 for implementing iVPN controller 102. Computer device 1100 includes network interface unit 1105 to communicate with a wired and/or wireless communication network so as to communicate with network devices of network underlay 104 and the CPE, a processor 1154 (or multiple processors, which may be implemented as software or hardware processors), and memory 1156. Network interface unit 1105 may include an Ethernet card to communicate over wired Ethernet links and/or a wireless communication card to communicate over wireless links.

Memory 1156 stores instructions for implementing methods described herein. Memory 1156 may comprise read only memory (ROM), random access memory (RAM), magnetic disk storage media devices, optical storage media devices, flash memory devices, electrical, optical, or other physical/tangible (non-transitory) memory storage devices. The processor 1154 is, for example, a microprocessor or a microcontroller that executes instructions stored in memory. Thus, in general, the memory 1156 may comprise one or more tangible computer readable storage media (e.g., a memory device) encoded with software comprising computer executable instructions and when the software is executed (by the processor 1154) it is operable to perform the operations described herein. Memory 1156 stores control logic 1158 to perform operations associated with components 402-408 and 802 of controller 102 described herein, so as to implement method 200. The memory 1156 may also store data 1160 used and generated by logic 1158, such as tables 605 and 1005.

In the example of FIG. 11, computer device is shown as a single computer device for implementing iVPN controller 102 by way of example, only. It is to be understood that controller 102 may be distributed across multiple computer devices that intercommunicate with each other over a network, for example.

Figure 12:
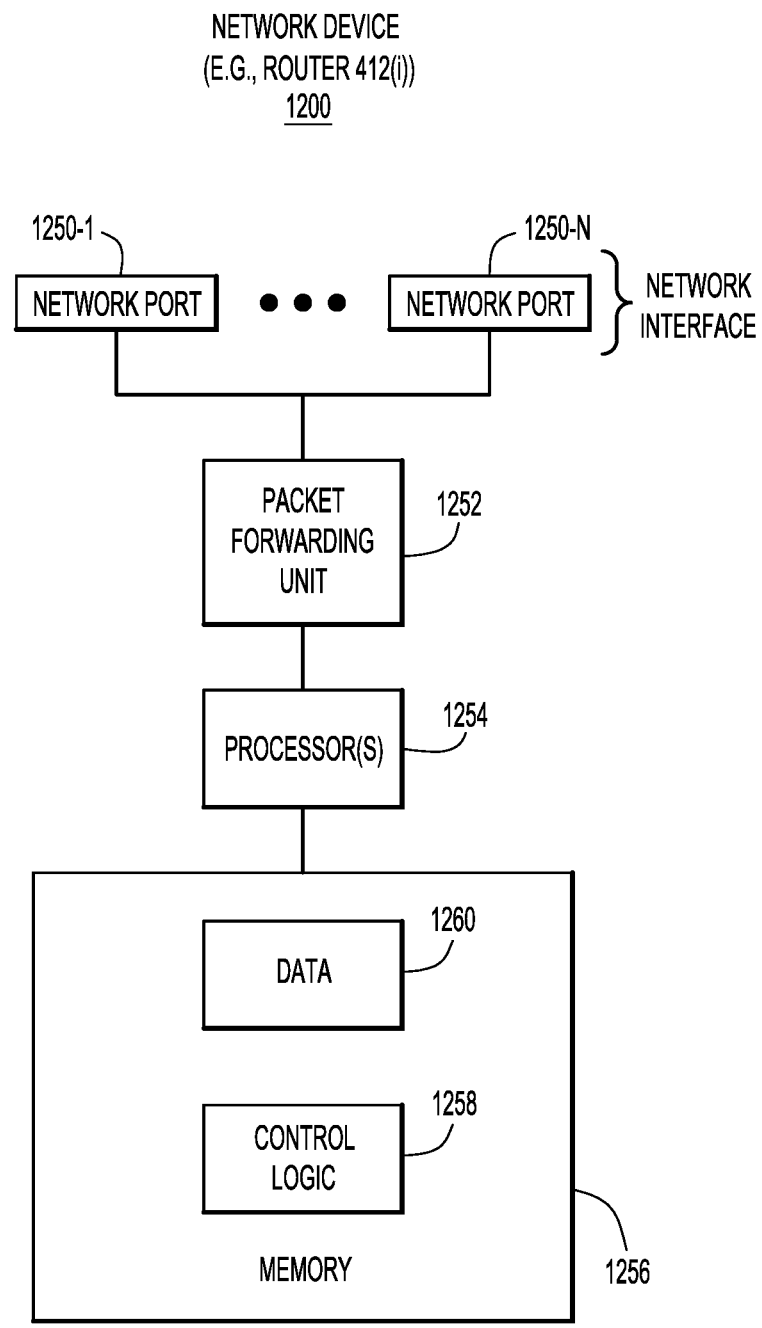
FIG. 12 is a block diagram of a network device such as a network router device or network switch device used in a network underlay of the iVPN architecture.

With reference to FIG. 12, there is a block diagram of a network device 1200 deployed in network underlay 104, e.g., an edge router. Network device 1200 may include a plurality of wired and/or wireless network ports 1250-1 through 1250-N or other form of network interface to communicate with wired and/or wireless communication networks in network underlay 104, iVPN controller 102, and the CPE, a packet forwarding unit 1252 having forward tables used to make packet forwarding decisions, a processor 1254 (or multiple processors) and memory 1256. The memory stores instructions for implementing methods described herein.

The memory 1256 may comprise read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. Memory 1256 stores control logic 1258 to perform operations described herein, such as operations associated with method 200, e.g., to accept network device configuration information and configure the network device to operate in accordance with that information, including to measure network performance attributes associated with traffic flows through the network device and report the measurements to iVPN controller 102. The memory may also store data 1260 used and generated by logic 1258.

In summary, presented herein is an adaptable and changing secure overlay model that is defined in one set of policies, where a change to the set of policies can be reacted to holistically and implemented in a unified fashion. As noted above, the techniques presented herein include three primary components, namely: (1) a policy model that can be used to describe the business-level policies; (2) a VPN policy resolver that translates business-level policies into network-level policies; and (3) a closed-loop system that measures in real time the discrepancy between the implemented network-level policy and the intended business-level policy, and that brings those measurements back to the VPN policy resolver. The VPN policy resolver can then react to minimize the discrepancy.

The techniques presented herein enable the precise translation of enterprise business-level VPN policies to network-level policies, thereby taking advantage of the sophisticated network features offered by modern service providers. The business level policies can include CLAUSES that specify how to dynamically react to network events, so as to guarantee the satisfaction of the SLA between enterprise customer and service provider.

Conventional arrangements consider the networks underlying VPNs as a transparent cloud and attempt to infer the best paths for use either by passive monitoring of the Transmission Control Protocol (TCP) or active probing. This may, at times, be sufficient for the lower end of the market, but it is not sufficient for Service Providers and larger Enterprises that, while offering CPE-CPE VPN solutions, also want to take full advantage of the underlay networks.

In the Service Provider segment, VPNs are challenged by overlay CPE-to-CPE VPN solutions. Technical analysis concluded that a CPE-CPE overlay VPN solution is likely to succeed if it provides support for enterprise feature set requirements which include: (1) complex VPN topologies, (2) enterprise class security and key management, and (3) differentiated SLAs. The current VPN solutions do not support this set of requirements. However, the techniques presented herein used as part of the iVPN system architecture addresses all of those requirements.

In summary, in one form, a method is provided comprising: receiving high-level network policies that represent a virtual private network (VPN) as a high-level policy model, the VPN providing secure connectivity between connection sites based on the high-level network policies; translating the high-level network policies into low-level device configuration information represented in a network overlay and used for configuring a network underlay that provides connectivity for the connection sites to the VPN; configuring the network underlay with the device configuration information so that the network underlay implements the VPN in accordance with the high-level policies; determining whether the network underlay is operating to direct traffic flows between the connection sites in compliance with the high-level network policies; and if it is determined that the network underlay is not operating in compliance with the high-level network policies, reconfiguring the network underlay with new low-level device configuration information so that the network underlay operates in compliance with the high-level network policies.

In another form, an apparatus is provided comprising: a network interface unit configured to communicate with network devices in a network underlay and customer premises equipment; and a processor connected with the network interface and configured to: receive high-level network policies that represent a virtual private network (VPN) as a high-level policy model, the VPN providing secure connectivity between connection sites based on the high-level network policies; translate the high-level network policies into low-level device configuration information represented in a network overlay and used for configuring the network underlay so as to provide connectivity for the connection sites to the VPN; configure the network underlay with the device configuration information so that the network underlay implements the VPN in accordance with the high-level policies; determine whether the network underlay is operating to direct traffic flows between the connection sites in compliance with the high-level network policies; and if it is determined that the network underlay is not operating in compliance with the high-level network policies, reconfigure the network underlay with new low-level device configuration information so that the network underlay operates in compliance with the high-level network policies.

In yet another form, a non-transitory computer readable storage media encoded with instructions is provided. When executed by a processor, the instructions cause the processor to: receive high-level network policies that represent a virtual private network (VPN) as a high-level policy model, the VPN providing secure connectivity between connection sites based on the high-level network policies; translate the high-level network policies into low-level device configuration information represented in a network overlay and used for configuring a network underlay that provides connectivity for the connection sites to the VPN; configure the network underlay with the device configuration information so that the network underlay implements the VPN in accordance with the high-level policies; determine whether the network underlay is operating to direct traffic flows between the connection sites in compliance with the high-level network policies; and if it is determined that the network underlay is not operating in compliance with the high-level network policies, reconfigure the network underlay with new low-level device configuration information so that the network underlay operates in compliance with the high-level network policies.

The above description is intended by way of example only.

What is claimed is:

1. A method performed at a network controller, comprising:
    receiving network policies that represent a virtual private network (VPN) as a policy model, the VPN providing secure connectivity between connection sites based on the network policies, wherein the network policies include a connectivity policy specifying that a first connection site is to communicate securely both over a secure physical link without encryption and over an unsecure physical link with encryption, and include an encryption policy that governs encryption of network traffic between the connection sites according to the connectivity policy;
    translating the network policies into device configuration information represented in a network overlay and used for configuring a network underlay that provides connectivity for the connection sites to the VPN, wherein the translating includes translating the encryption policy into encryption algorithms to be used by the first connection site for encrypting traffic sent from the first connection site over the unsecure physical link;
    configuring the network underlay with the device configuration information so that the network underlay implements the VPN in accordance with the network policies, and so that the first connection site is configured, based on the device configuration information, to communicate securely both over the secure physical link without encryption and over the unsecure physical link with encryption;

determining whether the network underlay is operating to direct traffic flows between the connection sites in compliance with the network policies; and if it is determined that the unsecure physical link has failed such that the first connection site is not operating in compliance with the network policies, reconfiguring the network underlay including reconfiguring the first connection site with new device configuration information so that the first connection site communicates only over the secure physical link without encryption until a new unsecure physical link is configured for use in the connection sites in compliance with the network policies.

2. The method of claim 1, wherein:

the receiving includes receiving a network requirement for one of the network policies and an indication of a measurable attribute that indicates whether the network underlay is operating in compliance with the network requirement; and the method further comprises, while the network underlay is operating to direct traffic flows for the VPN:
collecting attribute measurements from the network underlay; and
comparing the attribute measurements to the network requirement.

3. The method of claim 2, wherein:

if it is determined that the network underlay is not operating in compliance based on the comparing, the reconfiguring includes reconfiguring the network underlay with the new device configuration information.

4. The method of claim 3, wherein:

the network requirement includes a requirement that link bandwidth usage at a given one of the connection sites is not to exceed a predetermined fraction of a maximum link capacity available at the given connection site, and the measurable attribute includes link bandwidth usage;

the collecting includes collecting link bandwidth usage measurements from the given connection site;

the comparing includes comparing the link bandwidth usage measurements to the predetermined fraction of the maximum link capacity; and if the comparing indicates that the link bandwidth usage measurements exceed the predetermined fraction of the maximum link capacity, the reconfiguring includes reconfiguring the given connection site to increase the maximum link capacity.

5. The method of claim 1, wherein:

the connectivity policy further defines which of the connection sites are to be connected with each other via the VPN; and the translating includes:
translating the connectivity policy into forwarding states to be used by each connection site to implement traffic forwarding in the network underlay according to the connectivity policy; and
translating the encryption policy into encryption algorithms to be used by the connection sites for encrypting traffic sent from the connection sites; and the configuring includes pushing the forwarding states and the encryption algorithms to the connection sites.

6. The method of claim 5, wherein the connection sites each include a respective edge network device configured to permit respective customer premises equipment to communicate with the network underlay.

7. The method of claim 5, wherein:

the receiving further includes receiving a logical topology policy that defines a logical topology by which the connection sites are to be connected with each other; and the translating further includes translating the logical topology policy into the forwarding states so that the forwarding states implement traffic forwarding in the network underlay in accordance with the logical topology policy.

8. The method of claim 5, wherein:

the receiving further includes receiving a traffic engineering policy and a service insertion policy; and the translating further includes translating the connectivity policy into the one or more forwarding states so that the forwarding states implement traffic forwarding in the network underlay in accordance with the traffic engineering policy and the service insertion policy.

9. The method of claim 5, wherein:

the receiving further includes receiving a set of inter-site connectivity contracts that collectively represent the connectivity policy and the encryption policy, each contract specifying for a given connection site connections with other connection sites to which the given connection site is to be connected and whether traffic between the given connection site and the other connection sites is to be encrypted.

10. An apparatus comprising:

a network interface unit configured to communicate with network devices in a network underlay and customer premises equipment; and a processor connected with the network interface and configured to:

receive network policies that represent a virtual private network (VPN) as a policy model, the VPN providing secure connectivity between connection sites based on the network policies, wherein the network policies include a connectivity policy specifying that a first connection site is to communicate securely both over a secure physical link without encryption and over an unsecure physical link with encryption, and include an encryption policy that governs encryption of network traffic between the connection sites according to the connectivity policy;

translate the network policies into device configuration information represented in a network overlay and used for configuring the network underlay so as to provide connectivity for the connection sites to the VPN, wherein the processor is configured to translate the encryption policy into encryption algorithms to be used by the first connection site for encrypting traffic sent from the first connection site over the unsecure physical link;

configure the network underlay with the device configuration information so that the network underlay implements the VPN in accordance with the network policies, and so that the first connection site is configured, based on the device configuration information, to communicate securely both over the secure physical link without encryption and over the unsecure physical link with encryption;

determine whether the network underlay is operating to direct traffic flows between the connection sites in compliance with the network policies; and if it is determined that the unsecure physical link has failed such that the first connection site is not operating in compliance with the network policies, reconfigure the network underlay including the first connection site with new device configuration information so that the first connection site communicates only over the secure physical link without encryption until a new unsecure physical link is configured for use in the connection sites in compliance with the network policies.

11. The apparatus of claim 10, wherein the processor is configured to:
  receive a network requirement for one of the network policies and an indication of a measurable attribute that indicates whether the network underlay is operating in compliance with the network requirement; and
  while the network underlay is operating to direct traffic flows for the VPN:
    collect attribute measurements from the network underlay; and
    compare the attribute measurements to the network requirement.

12. The apparatus of claim 11, wherein the processor is configured to:
  if it is determined that the network underlay is not operating in compliance based on the comparing, reconfigure the network underlay with the new device configuration information.

13. The apparatus of claim 12, wherein the network requirement includes a requirement that link bandwidth usage at a given one of the connection sites is not to exceed a predetermined fraction of a maximum link capacity available at the given connection site, and the measurable attribute includes link bandwidth usage, and wherein the processor is configured to:
  collect link bandwidth usage measurements from the given connection site;
  compare the link bandwidth usage measurements to the predetermined fraction of the maximum link capacity; and
  if the comparing indicates that the link bandwidth usage measurements exceed the predetermined fraction of the maximum link capacity, reconfigure the given connection site to increase the maximum link capacity.

14. The apparatus of claim 10, wherein the connectivity policy further defines which of the connection sites are to be connected with each other via the VPN; and
  the processor is configured to:
    translate the connectivity policy into forwarding states to be used by each connection site to implement traffic forwarding in the network underlay according to the connectivity policy;
    translate the encryption policy into encryption algorithms to be used by the connection sites for encrypting traffic sent from the connection sites; and
    push the forwarding states and the encryption algorithms to the connection sites.

15. The apparatus of claim 14, wherein processor is configured to:
  receive a logical topology policy that defines a logical topology by which the connection sites are to be connected with each other; and
  translate the logical topology policy into the forwarding states so that the forwarding states implement traffic forwarding in the network underlay in accordance with the logical topology policy.

16. A non-transitory computer readable storage media encoded with instructions that, when executed by a processor, cause the processor to:
  receive network policies that represent a virtual private network (VPN) as a policy model, the VPN providing secure connectivity between connection sites based on the network policies, wherein the network policies include a connectivity policy specifying that a first connection site is to communicate securely both over a secure physical link without encryption and over an unsecure physical link with encryption, and include an encryption policy that governs encryption of network traffic between the connection sites according to the connectivity policy;
  translate the network policies into device configuration information represented in a network overlay and used for configuring a network underlay that provides connectivity for the connection sites to the VPN, wherein the instructions that cause the processor to translate include instructions for translating the encryption policy into encryption algorithms to be used by the first connection site for encrypting traffic sent from the first connection site over the unsecure physical link;
  configure the network underlay with the device configuration information so that the network underlay implements the VPN in accordance with the network policies, and so that the first connection site is configured, based on the device configuration information, to communicate securely both over the secure physical link without encryption and over the unsecure physical link with encryption;
  determine whether the network underlay is operating to direct traffic flows between the connection sites in compliance with the network policies; and
  if it is determined that the unsecure physical link has failed such that the first connection site is not operating in compliance with the network policies, reconfiguring the network underlay including reconfiguring the first connection site with new device configuration information so that the first connection site communicates only over the secure physical link without encryption until a new unsecure physical link is configured for use in the connection sites in compliance with the network policies.

17. The computer readable storage media of claim 16, wherein the instructions cause the processor to:
  receive a network requirement for one of the network policies and an indication of a measurable attribute that indicates whether the network underlay is operating in compliance with the network requirement; and
  while the network underlay is operating to direct traffic flows for the VPN:
    collect attribute measurements from the network underlay; and
    compare the attribute measurements to the network requirement.

18. The computer readable storage media of claim 17, wherein the instructions cause the processor to:
  if it is determined that the network underlay is not operating in compliance based on the comparing, reconfigure the network underlay with the new device configuration information.

19. The computer readable storage media of claim 18, wherein the network requirement includes a requirement that link bandwidth usage at a given one of the connection sites is not to exceed a predetermined fraction of a maximum link capacity available at the given connection site, and the measurable attribute includes link bandwidth usage, and
  wherein the instructions cause the processor to:
    collect link bandwidth usage measurements from the given connection site;

compare the link bandwidth usage measurements to the predetermined fraction of the maximum link capacity; and if the comparing indicates that the link bandwidth usage measurements exceed the predetermined fraction of the maximum link capacity, reconfigure the given connection site to increase the maximum link capacity.

20. The computer readable storage media of claim 16, wherein:

the connectivity policy further defines which of the connection sites are to be connected with each other via the VPN; and the instructions cause the processor to:

translate the connectivity policy into forwarding states to be used by each connection site to implement traffic forwarding in the network underlay according to the connectivity policy;

translate the encryption policy into encryption algorithms to be used by the connection sites for encrypting traffic sent from the connection sites; and push the forwarding states and the encryption algorithms to the connection sites.

21. The computer readable storage media of claim 20, wherein the instructions cause the processor to:

receive a logical topology policy that defines a logical topology by which the connection sites are to be connected with each other; and translate the logical topology policy into the forwarding states so that the forwarding states implement traffic forwarding in the network underlay in accordance with the logical topology policy.

* * * * *